United States Patent
Lindèn (10) Patent No.: US 9,752,618 B2
(45) Date of Patent: Sep. 5, 2017

(54) CAGE FOR A BEARING ASSEMBLY AND MANUFACTURING METHOD

(71) Applicant: AKTIEBOLAGET SKF, Göteborg (SE)

(72) Inventor: Hans Lindèn, Ytterby (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/782,379

(22) PCT Filed: Apr. 3, 2014

(86) PCT No.: PCT/SE2014/000034
§ 371 (c)(1),
(2) Date: Oct. 5, 2015

(87) PCT Pub. No.: WO2014/163548
PCT Pub. Date: Oct. 9, 2014

(65) Prior Publication Data
US 2016/0040717 A1    Feb. 11, 2016

(30) Foreign Application Priority Data

Apr. 5, 2013  (SE) ........................................ 1300244

(51) Int. Cl.
| F16C 33/54 | (2006.01) |
| B21D 53/12 | (2006.01) |
| F16C 33/42 | (2006.01) |
| F16C 33/46 | (2006.01) |
| F16C 33/48 | (2006.01) |
| F16C 23/08 | (2006.01) |

(52) U.S. Cl.
CPC ............ *F16C 33/545* (2013.01); *B21D 53/12* (2013.01); *F16C 33/422* (2013.01); *F16C 33/427* (2013.01); *F16C 33/4658* (2013.01); *F16C 33/485* (2013.01); *F16C 33/542* (2013.01); *F16C 33/547* (2013.01); *F16C 23/086* (2013.01)

(58) Field of Classification Search
CPC ...... B21D 53/12; F16C 33/545; F16C 33/422; F16C 33/542
See application file for complete search history.

(56) References Cited

U.S. PATENT DOCUMENTS

| 449,968 A | 4/1891 | Simonds |
| 1,080,082 A * | 12/1913 | Sparks .................. F16C 19/163 384/531 |
| 1,320,096 A | 10/1919 | Rouanet |

(Continued)

FOREIGN PATENT DOCUMENTS

EP         0270262 A1      6/1988

*Primary Examiner* — Thomas R. Hannon
(74) *Attorney, Agent, or Firm* — Bryan Peckjian; SKF USA Inc. Patent Dept.

(57) ABSTRACT

A method for producing an annular-shaped cage for a rolling bearing assembly. The method comprises steps of: (a) providing a workpiece contained in a plane having a first side and a second side; (b) forming an annular-shaped cage from the workpiece, the annular-shaped cage having a U-shaped cross section such that portions of the first side of the workpiece face each other; and (c) forming a plurality of windows in the workpiece for receiving and positioning a set of rolling elements.

12 Claims, 6 Drawing Sheets

(56) References Cited

U.S. PATENT DOCUMENTS

| | | | | |
|---|---|---|---|---|
| 1,697,064 | A | * | 1/1929 | Hughes ................. F16C 19/183 384/532 |
| 1,730,630 | A | * | 10/1929 | Sauer ...................... F16C 33/41 280/279 |
| 1,794,772 | A | * | 3/1931 | Hughes ................. F16C 19/184 29/898.067 |
| 1,824,787 | A | * | 9/1931 | Nolan ...................... B21K 1/05 384/575 |
| 1,866,936 | A | * | 7/1932 | Kifer .................... F16C 19/385 384/575 |
| 3,301,616 | A | * | 1/1967 | Wilson ................. F16C 33/543 384/575 |
| 4,322,879 | A | * | 4/1982 | Warchol ................ B21D 53/12 29/898.067 |
| 5,152,615 | A | | 10/1992 | Bauer et al. |
| 6,330,748 | B1 | | 12/2001 | Müntnich et al. |
| 9,394,943 | B2 | * | 7/2016 | Karlsson ............. F16C 33/6614 |

* cited by examiner

CAGE FOR A BEARING ASSEMBLY AND MANUFACTURING METHOD

CROSS REFERENCE TO RELATED APPLICATION

This is a United States National Stage Application claiming the benefit of International Application Number PCT/SE2014/000034 filed on 3 Apr. 2014 (03.04.2014), which claims the benefit of Sweden (SE) Patent Application Number 1300244-9, both of which are incorporated herein by reference in their entireties.

FIELD OF THE INVENTION

The present invention relates to a method for producing a cage for a rolling bearing assembly. In addition, the present invention relates to a cage for a rolling bearing assembly. Moreover, the present invention relates to a cage assembly for a rolling bearing assembly.

The cage may for example be used for controlling a position of a set of rolling elements in a roller bearing assembly or ball bearing assembly, or equivalent. The rolling elements may either be controlled in relation to each other and/or in relation to the raceways of the rolling bearing assembly.

BACKGROUND OF THE INVENTION

In the field of rolling bearing assemblies, it is common to make use of a cage or bearing cage in order to separate rolling elements of a rolling element bearing from each other and control the position of the rolling elements in relation to other components of the rolling element bearing such as raceways. The bearing cage prevents the rolling elements, such as balls, rollers, or tapered rollers, from rubbing against each other, and guides the rolling elements in relation to the rolling bearing raceways in a suitable manner.

In the art, it is known to make use of bearing cages made of sheet metal. An example of a cage for a bearing assembly is disclosed in U.S. Pat. No. 5,152,615. U.S. Pat. No. 5,152,615 discloses a bearing assembly including a cage made of a bent strip of sheet material having abutting ends connected to another.

The added weight to the bearing assembly from the cage increases the overall weight and moment of inertia of the rotating components of the bearing assembly. The cage also impedes the performance of the bearing assembly and increases the cost for handling and manufacturing.

Hence, there is a need for providing a rolling bearing cage assembly allowing for improved performance, reduced manufacturing costs and reduced material costs. In addition, there is a need for providing a method of producing a cage for a rolling bearing assembly in a simple and effective manner.

SUMMARY OF THE INVENTION

It is an object of the present invention to provide an efficient manufacturing method for a cage for a rolling bearing assembly. More specifically, it is an object of the present invention to provide an efficient manufacturing method for an annular-shaped cage for a rolling bearing assembly. It is also an object of the present invention to provide an annular-shaped cage for a rolling bearing assembly which allows for improved performance. Moreover, it is an object of the present invention to provide to an annular-shaped cage assembly for a rolling bearing assembly.

These and other objects are met by the subject-matters provided in the independent claims. Preferred optional features are recited in the associated dependent claims.

According to a first aspect, there is provided a method for producing an annular-shaped cage for a rolling bearing assembly. The method comprises the steps of: providing a workpiece contained in a plane P having a first side and a second side; forming an annular-shaped cage from the workpiece, the annular-shaped cage having a U-shaped cross section such that portions of the first side of the workpiece face each other; and forming a plurality of windows in the workpiece for receiving and positioning a set of rolling elements.

An advantage of the present invention is that the handling and manufacturing of the annular-shaped cage is considerably improved in contrast to current manufacturing methods, which often require additional assembly steps. Moreover, it becomes possible to manufacture the annular-shaped cage in a cost efficient manner, using manufacturing techniques with low scrapes rates, low tool costs and low energy consumption, while allowing for high production rates, high precision and low material costs.

In particular, by the principle of the present invention, it becomes possible to manufacture the annular-shaped cage from a workpiece of a thin and light material. To this end, the thickness and weight of the cage can be reduced, which, in turn, may reduce its moments of inertia leading to improved and more efficient rolling bearings.

Moreover, in the context of the present invention, a reduced thickness of the cage will have a positive impact on the available space in the rolling bearing for holding and storing lubricant, such as grease or oil. In addition, due to the U-shaped cross section of the annular-shaped cage, it becomes possible to provide a better holding and storing facility for the lubricant while reducing the risk of lubricant leakage. It is to be noted that if the available space is increased inside the annular-shaped cage, the cage can contain an increased amount of lubricant such that lubricant can dissipate to the rolling elements and raceway of a rolling bearing during a longer time period. Accordingly, the performance of the rolling bearing is increased while the need for and cost of maintenance is reduced. The need for auxiliary lubrications systems may also be reduced or avoided, which can lead to further cost reductions and reduced space requirements.

Using a thinner workpiece may also reduce the cost and time associated with cutting the workpiece. In this context of the present invention, by the term "thin" or "thinner" generally means a workpiece with a thickness between 0.5-15 mm.

By forming a plurality of windows in the workpiece, a rib-like structure is obtained in which the windows are separated from each other by rib portions.

Advantageously, the workpiece for forming the annular-shaped cage may be a one-piece sheet material. By providing an annular-shaped cage in the form of a one-piece sheet material, the number of manufacturing steps can be kept to a minimum. In particular, the pre-step of integrating one part of the cage with another part of the cage or sealing two material pieces of the cage can be avoided. As such, the costs for producing the annular-shaped cage can be kept to a minimum. In addition, by using a one-piece sheet material, it becomes possible to avoid unfavourable joints between two pieces of material sheets. Typically, the use of a one-piece sheet material provides the annular-shaped cage with an improved homogeneous structure.

Alternatively, the workpiece for forming the annular-shaped cage may comprise several pieces of sheet materials. By using several pieces of sheet materials, it becomes possible to provide an annular-shaped cage having different thicknesses along the cross section. In addition, it becomes possible to further optimizing the material characteristics of the annular-shaped cage. As an example, by forming the annular-shaped cage from several pieces of sheet material, it becomes possible to vary the thickness along the circumferential direction of the annular-shaped cage. The thickness can be varied by various means as is evident to the skilled person, e.g. when the annular-shaped cage is manufacturer by roll forming.

Moreover, the workpiece may be formed from a piece of flat metal. Alternatively, the workpiece may be formed from a continuous metal strip arranged as a coil. It is also contemplated that the workpiece can be made of several layers of the same material.

According to an example embodiment, the workpiece may be provided with an undulating structure. Typically, the undulating structure has a wavelike shape comprising a plurality of consecutively repeating sections. In this manner, when the annular-shaped cage is formed by the workpiece, the undulating structure extends circumferentially around the cage. The undulating structure of the annular-shaped cage can either be uniform or non-uniform.

One advantage with an undulating, or corrugated, structure is that the stiffness of the annular-shaped cage is improved in relation to the thickness of the sheet material of which it is formed. Thereby, the thickness and weight of the annular-shaped cage may be reduced, which, in turn, reduces its moments of inertia leading to improved and more efficient rolling bearings.

For example, the wavelike shape of the undulating structure is formed of repeating sections having a sine waveform shape, a square waveform shape, a triangular waveform shape, a saw tooth waveform shape, or a combination of any of the above-mentioned waveforms.

According to an example embodiment, the workpiece may be provided in the form of a longitudinal workpiece. In this context of the present invention, the longitudinal workpiece has two opposing longitudinal edges, a first transverse edge and a second transverse edge.

Advantageously, the U-shaped cross section can be formed by roll-forming. This is particularly useful since the stiffness and the structural integrity of the construction is improved in view of other technologies.

Advantageously, the U-shaped cross section can be formed before the step of forming the annular-shaped cage. Alternatively, the U-shaped cross section can be formed after the step of forming the annular-shaped cage.

According to an example embodiment, the annular-shaped cage may be formed by bending the workpiece about a transverse axis T.

In order to maintain the stability of the annular-shaped cage in use, the first transverse edge and the second transverse edge may be attached together by clip. The clip may be provided in the form of a U-shaped clip.

According to an example embodiment, the workpiece is provided in the form of a circular workpiece, the circular workpiece having a hole in the centre.

Using a circular workpiece may reduce the number of manufacturing steps, which can simplify the manufacturing process as well as reduce the manufacturing cost. Moreover, no joints are needed to form an annular-shaped cage from a circular workpiece. This may further improve the strength of the cage.

According to an example embodiment, the annular-shaped cage may be formed by flow-forming. One advantage with the flow-forming technology is that the manufacturing method can be operated by programmed commands so as to allow for enhanced flexibility in the design of the cage.

In various exemplifying embodiments, the plurality of windows may be formed by removing pieces of material from the workpiece.

There are several different possibilities for removing the pieces of material from the workpiece in accordance with the invention. For example, the pieces of material may be removed by a method of punching. Punching offers a technology which is rather economical compared to other technologies while maintaining a high-precision in the operation. Alternatively, the pieces of material may be removed by a method of laser cutting. One advantage with the laser cutting technology is that the manufacturing method can be operated by programmed commands, e.g. by a PC, so as to allow for enhanced flexibility in the design of the cage. Alternatively, the pieces of material may be removed by a method of water cutting. One advantage with the water cutting technology is that the manufacturing method can be operated by programmed commands, e.g. by a PC, so as to allow for enhanced flexibility in the design of the cage. Accordingly, the pieces of material may be removed by a method selected from the group of punching, laser cutting and water cutting. Other technologies for removing the pieces of the materials may be etching or mechanical treatment.

Advantageously, the workpiece can be made of metal. One example of a suitable metal is stainless steel. In one example embodiment, the workpiece is made of pre-hardened metal. Using a workpiece made of pre-hardened metal may reduce the cost of manufacturing of the cage.

The present inventions also relates to an annular-shaped cage for a rolling bearing assembly, such as a roller bearing or ball bearing.

Hence, according to a second aspect of the present invention, there is provided an annular-shaped cage for a rolling bearing assembly manufactured by one of the above described methods in relation to the first aspect of the present invention.

Effects and features of this second aspect of the present invention are largely analogous to those described above in relation to the first aspect of the present invention.

The present inventions also relates to an annular-shaped cage assembly for a rolling bearing assembly, such as a roller bearing or ball bearing. Hence, according to a third aspect of the present invention, there is provided an annular-shaped cage assembly for a rolling bearing assembly. The annular-shaped cage assembly comprises an annular-shaped cage having a U-shaped cross-section and a plurality of windows for receiving and positioning a set of rolling elements. The plurality of windows is arranged spaced apart along a circumferential direction of the annular-shaped cage. The annular-shaped cage assembly further comprises a locking ring engageable with an open side of the annular-shaped cage for securing the set of rolling elements. The locking ring can be provided with an integrated seal for sealing the locking ring to the annular-shaped cage. Alternatively, the locking ring may be used without an integrated seal.

Such an annular-shaped cage assembly may be produced in a cost efficient manner, using manufacturing techniques with low scrapes rates, low tool costs and low energy consumption, while allowing for high production rates, high precision and low material costs.

Further effects and features of this third aspect of the present invention are largely analogous to those described above in relation to the first aspect and second aspect of the present invention.

Advantageously, the annular-shaped cage is formed from a one-piece sheet material. Alternatively, the annular-shaped cage is formed from several pieces of sheet materials.

The annular-shaped cage may also have a reduced thickness and weight, which reduces its moments of inertia and increases the space for storing and holding lubricant, such as grease or oil. This may, in turn, lead to improved and more efficient rolling bearings.

Moreover, the provision of an integrated seal may facilitate the maintenance and reduce the maintenance cost.

Advantageously, the annular-shaped cage assembly may comprise a clip, as described above in relation to the first and second aspects of the present invention.

The annular-shaped cage assembly may be used in any type of rolling bearing assembly. According to various exemplifying embodiments, the rolling bearing assembly is formed of a radial rolling element bearing, a spherical roller thrust bearing, a tapered roller bearing, a cylindrical roller thrust bearing, a thrust ball bearing, an angular contact ball bearing, toroidal roller bearing, needle bearing, or a combination of the two or more of these bearing types. For example, the bearing assembly may comprise a first and a second rolling element bearing arrangement, wherein the first and the second rolling element bearings may be formed of different bearing types with different rolling element and raceways designs, such as according to the characteristics of any one of exemplified bearing types described above.

Additional features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following illustrative and non-limiting detailed description of an exemplary embodiment of the present invention, wherein.

DETAILED DESCRIPTION OF EMBODIMENTS OF THE INVENTION

The present invention will now be described more fully hereinafter with reference to the accompanying drawings, in which a currently preferred embodiment of the invention is shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

In the drawings, reference number 10 generally denotes an annular-shaped cage which may be manufactured using the method of an embodiment of the present invention. Such an annular-shaped cage is used in a rolling bearing assembly. The annular-shaped cage has a U-shaped cross section. Moreover, the annular-shaped cage is provided with a first set of windows and a second set of windows (7, 7', 25, 25', 102, 102') for receiving and positioning a set of rolling elements (104, 204, 205). The plurality of windows (7, 7', 25, 25', 102, 102') is arranged spaced apart along a circumferential direction of the annular-shaped cage (10). It is to be noted that in the description to follow, the annular-shaped cage 10 may sometimes only be denoted as "cage", "rolling bearing cage" or "bearing cage".

Referring now to the drawings and to FIGS. 1a-1d in particular, there is depicted a method for producing an annular-shaped cage for a rolling bearing assembly according to an example embodiment of the present invention.

Figure 1A:
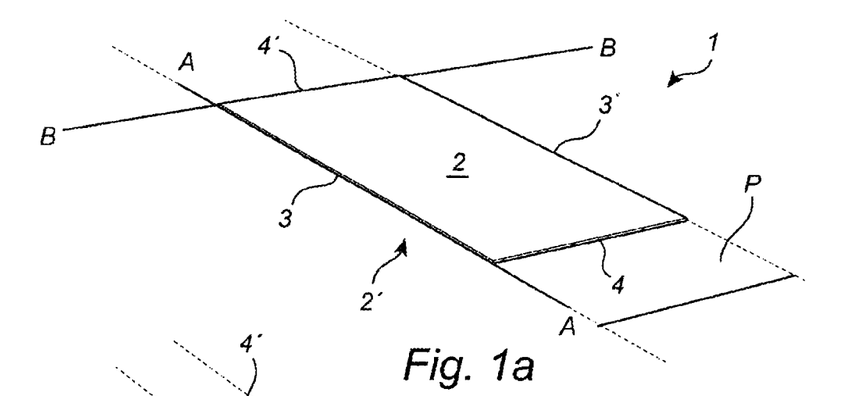
FIGS. 1a, 1b, 1c, and 1d schematically illustrate a method for producing an annular-shaped cage for a rolling bearing assembly according to an example embodiment of the present invention.

In the following, the expression "longitudinal" refers to a direction which essentially coincides with line A-A of FIG. 1a. The term "transverse" refers to a direction which is perpendicular to the line A-A and essentially coincides with line B-B of FIG. 1a.

In the illustrated embodiment, there is provided a workpiece 1. The workpiece 1 is contained in a plane P and has a first side 2 and a second side 2'. In FIG. 1a, the plane P contains lines A-A and B-B. The workpiece 1 here is provided in the form of a one-piece sheet material. Typically, the workpiece 1 is provided in the form of a longitudinal workpiece, having a first longitudinal edge 3 opposing a second longitudinal edge 3' and a first transverse edge 4 opposing a second transverse edge 4'. As shown in FIG. 1a, the shape of the workpiece 1 resembles a rectangle. However, several shapes are conceivable as long as an annular-shaped cage can be manufactured from the workpiece 1.

Accordingly, due to the fact that the workpiece is contained in the plane P, the workpiece 1 can be considered as substantially flat. For example, the material of the workpiece 1 may have a thickness between 0.5-20 mm, an extension in the longitudinal direction between 500-2000 mm, and an extension in the transverse direction between 500-2000 mm. The material can be steel, stainless steel, polymer or any other suitable material. The workpiece 1 may be formed from a piece of flat metal or from a continuous metal strip arranged as a coil. It is also contemplated that the workpiece can be made of several layers of the same material. In addition, it is contemplated that the workpiece can be made of several pieces of material, forming an integrated workpiece.

Figure 1B:
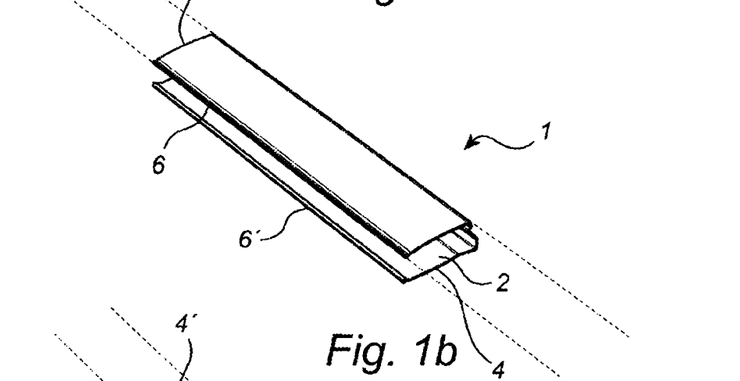

In a second step of the method according to the present invention, and as shown in FIG. 1b, the U-shaped cross section of the annular-shaped cage 10 is formed by folding the workpiece 1. To effect the U-shaped cross section, the workpiece 1 is folded about a longitudinal axis so that portions of the first side 2 of the workpiece 1 face each other. In this manner, the desired U-shaped cross section of the annular-shaped cage 10 is obtained in a simple manner. As may be gleaned from FIG. 1b, the U-shaped cross section here is defined by the curvature of the bent edges 4 and 4'. The folding process may be carried out by roll forming, for example, a CNC technology. However, other folding processes are conceivable as long as the U-shaped cross section of the cage 10 can be obtained by simple measures. The first longitudinal edge 3 and the second longitudinal edge 3' form a first rim portion 6 and a second rim portion 6', respectively, as is illustrated in FIG. 1b.

Figure 1C:
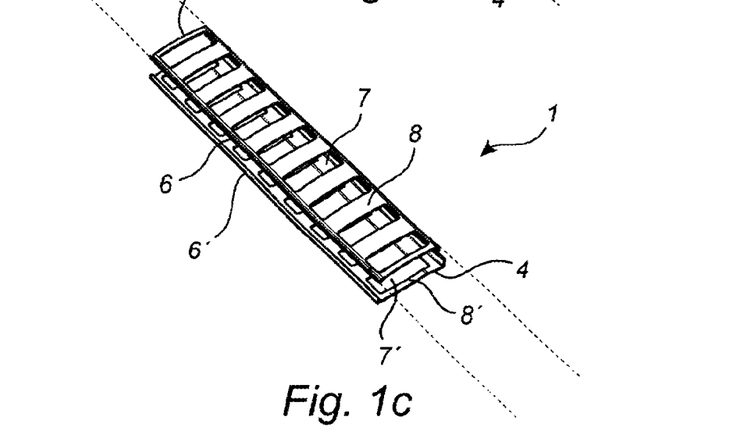

In order to make sure that the final annular-shaped cage 10 is configured for receiving and positioning a set of rolling elements, a first set of windows 7 and a second set of windows 7', or openings, are formed in the workpiece 1. The set of windows 7 and 7' may be formed by removing pieces of material from the workpiece 1 so that the remaining material forms a rib-like structure with a first rib portion 8 and a second rib portion 8', as shown in FIG. 1c. The pieces of material may be removed by a method of punching. Alternatively, the pieces of material may be removed by a method of laser cutting. Alternatively, the pieces of material may be removed by a method of water cutting The first rib portions 8 are arranged in a longitudinally spaced apart configuration in relation to each other, wherein each one of the first rib portions 8 extends essentially transverse relative to the first rim portion 6. The second rib portions 8' are similarly arranged with respect to the second rim portion 6'.

The windows 7 and 7' are formed between adjacent spaced apart rib portions 8 and 8', respectively. Each window of the first set of windows 7 forms a pair with a window in the second set of windows 7', and each pair of windows is adapted to receive and control the position of a rolling element of a rolling bearing. The rolling elements are thus to be positioned inside the cage 5, i.e. in the space formed between the portions of the first side 2 of the workpiece 1 which face each other. This part of the present invention is further described in relation to FIGS. 3a and 4 below.

The windows 7 and 7' may be adapted to the shape of the rolling element. In FIG. 1c, the windows 7 and 7' are substantially rectangular and symmetric and suitable for a set of cylindrical rolling elements. However, the windows 7 and 7' may also be adapted to rolling elements having other shapes. For example, the windows 7 and 7' may be provided with curved shapes with curved rib portions 8 and 8', respectively, corresponding to rolling elements having curved shapes, such as symmetrical or non-symmetrical roller elements, for example barrel-shaped or tapered rollers.

Figure 1D:
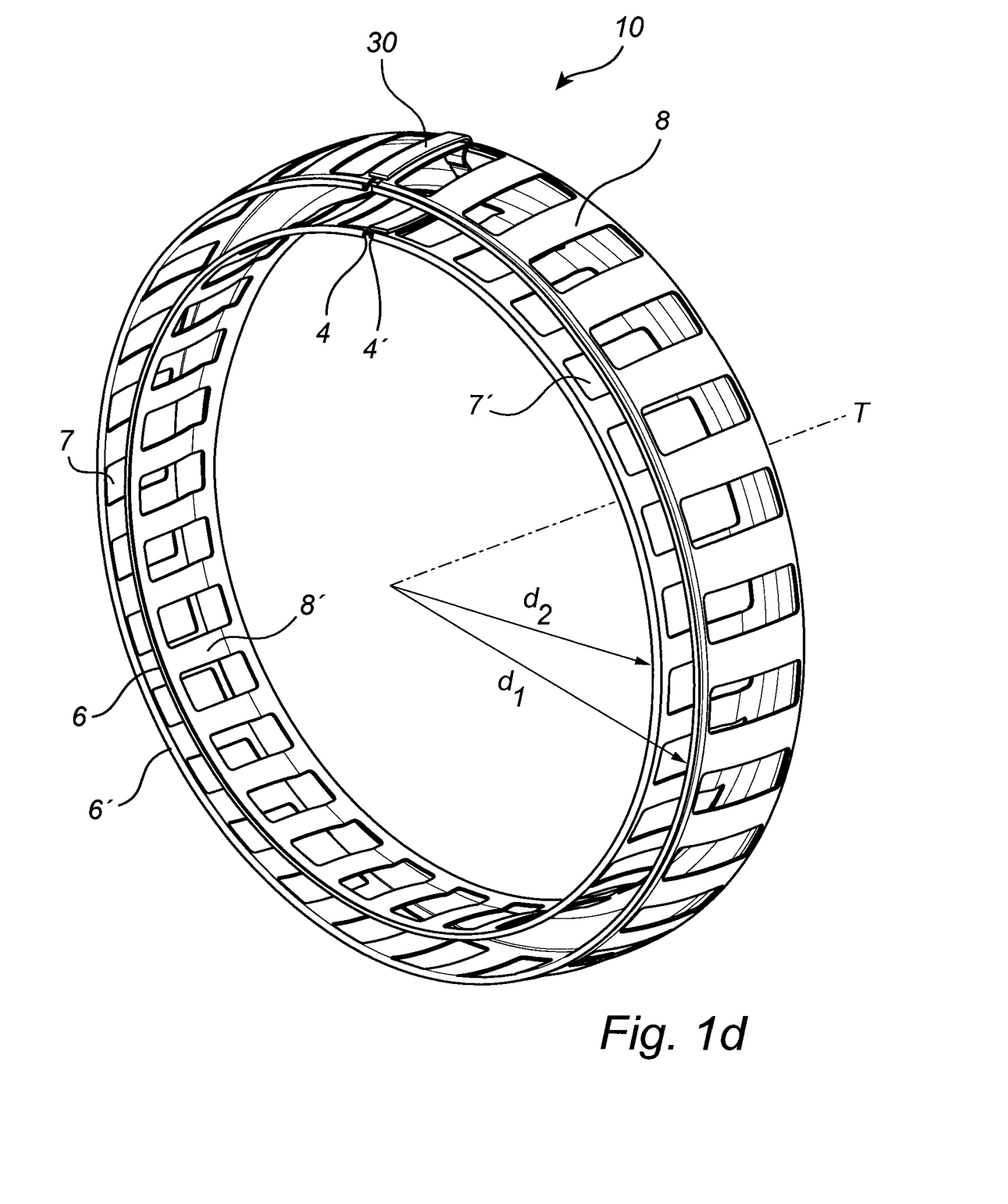

After forming the plurality of windows 7 and 7', an annular-shaped cage 10 is formed, as shown in FIG. 1d. However, it is also conceivable that the annular shape of the cage 10 can be formed before the plurality of windows 7 and 7' is formed. This may be achieved by bending the workpiece 1 about a transverse axis T so that the edges 4 and 4' face each other. The edges 4 and 4' can then be attached together, for example by using a clip 30. In accordance with embodiments of the invention, the clip 30 may be U-shaped. As illustrated in FIG. 1d, the first rim portion 6 forms an inner diameter d2 and the second rim portion 6' forms an outer diameter d1 of the annular-shaped cage 10. In this manner, the first set of windows 7 and the first rib portions 8 are radially separated from the second set of windows 7' and the second rib portions 8'. Hence, there is a radial difference corresponding to the difference between the inner diameter d2 and the outer diameter d1. The inner diameter d2 is preferably between 100-700 mm. The outer diameter d1 is preferably between 300-900 mm. The width of the difference is preferably between 100-300 mm.

Figure 2A:
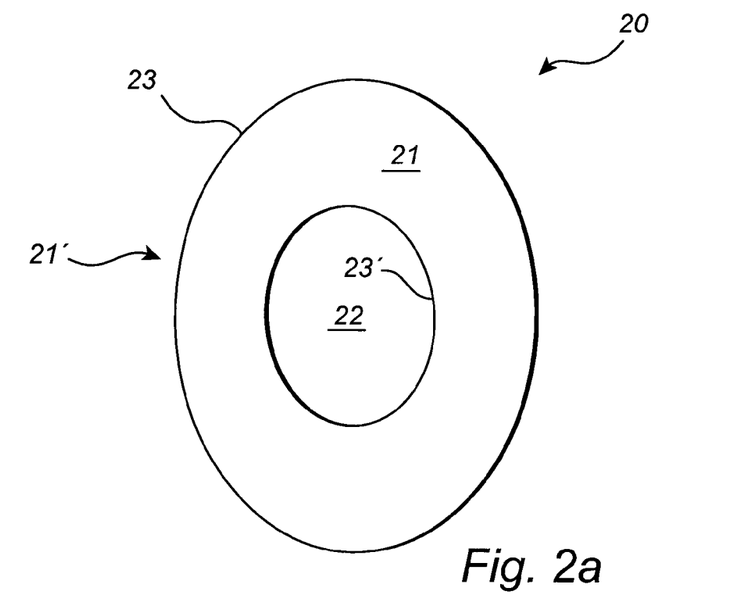
FIGS. 2a, 2b, and 2c schematically illustrate a method for producing an annular-shaped cage for a rolling bearing assembly according to a further example embodiment of the present invention.
Figure 2B:
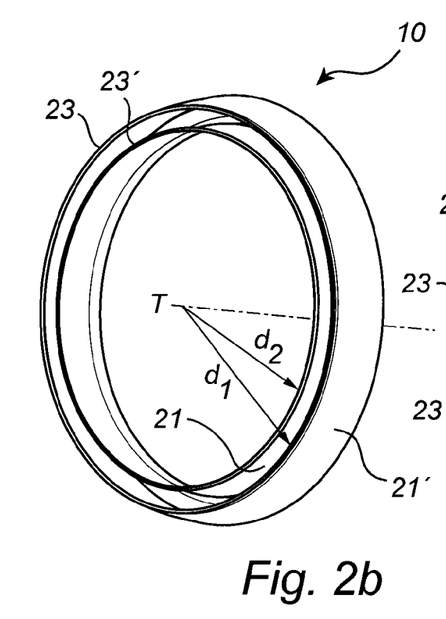
Figure 2C:
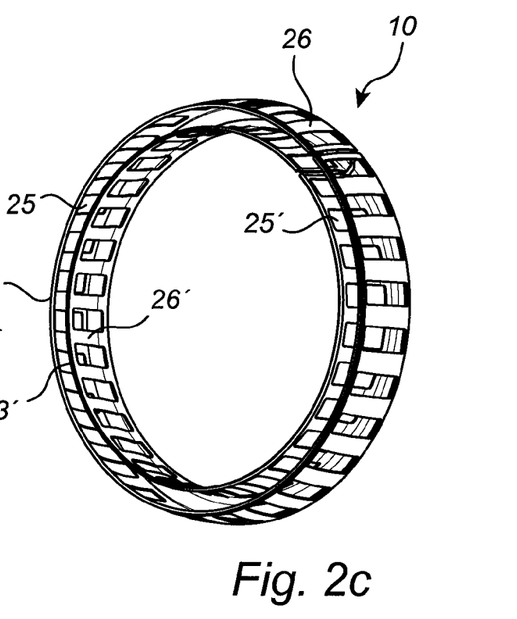

With reference to FIGS. 2a-2c, a further example embodiment of a method for manufacturing a rolling bearing cage according to the present invention will be described.

As illustrated in FIG. 2a, there is provided a workpiece 20, which is contained in a plane P. The workpiece 20 has a first side 21 and a second side 21'. The workpiece 20 here is cut from a piece of flat sheet material. For example, the material of the workpiece 1 may have a thickness between 0.5-20 mm. The material can be steel, stainless steel, polymer or any other suitable material. As is illustrated in FIG. 2a, the workpiece 20 here is provided in the form of a circular one-piece sheet material having a hole 22 in the centre. Such a circular workpiece 20 has coaxial inner 23' and outer 23 rim portions. The hole 22 may have a diameter between 100-700 mm, while the outer diameter of the circular workpiece may be between 300-1000 mm.

Turning now to FIG. 2b, an annular-shaped cage 10 having a U-shaped cross section is formed in one method step. This embodiment of the present invention is advantageous in that the workpiece 20 is transformed into the final annular-shaped cage 10 having a U-shaped cross section without any further additional step. The annular-shaped cage 10 is such that portions of the first side 21 face each other. The U-shaped cross section may be obtained by flow forming the work piece 20. One example of a flow-forming technique is CNC technology.

Analogously to the previous embodiment in FIG. 1a-1d, a first set of windows 25 and a second set of windows 25', or openings, are formed in the cage 10. The windows 25 and 25' may be formed by removing pieces of material from the workpiece 20 so that a rib-like structure with first 26 and second 26' rib portions is obtained, as illustrated in FIG. 2c. The pieces of material may be removed by a method of punching. Alternatively, the pieces of material may be removed by a method of laser cutting. Alternatively, the pieces of material may be removed by a method of water cutting.

The first rib portions 26 are arranged in a circumferentially spaced apart configuration in relation to each other, wherein each one of the first rib portions 26 extend essentially perpendicular to the outer rim portion 23. The second rib portions 26' are similarly arranged with respect to the inner rim portion 23'.

The windows 25 and 25' may be adapted to the shape of the rolling elements. In FIG. 2c, the windows 25 and 25' are substantially rectangular and symmetric and suitable for a set of cylindrical rolling elements. However, the windows 25 and 25' may also be adapted to rolling elements having other shapes. For example, the windows 25 and 25' may be provided with curved shapes with curved rib portions 26 and 26', respectively, corresponding to rolling elements having curved shapes, such as symmetrical or non-symmetrical roller elements, for example barrel-shaped or tapered rollers.

It is to be noted that although the figures may show a specific order of method steps, the order of the steps may differ from what is depicted. Also two or more steps may be performed concurrently or with partial concurrence. Such variation may depend on a choice of implementation. All such variations are within the scope of the disclosure.

Figures 3A, 3B:
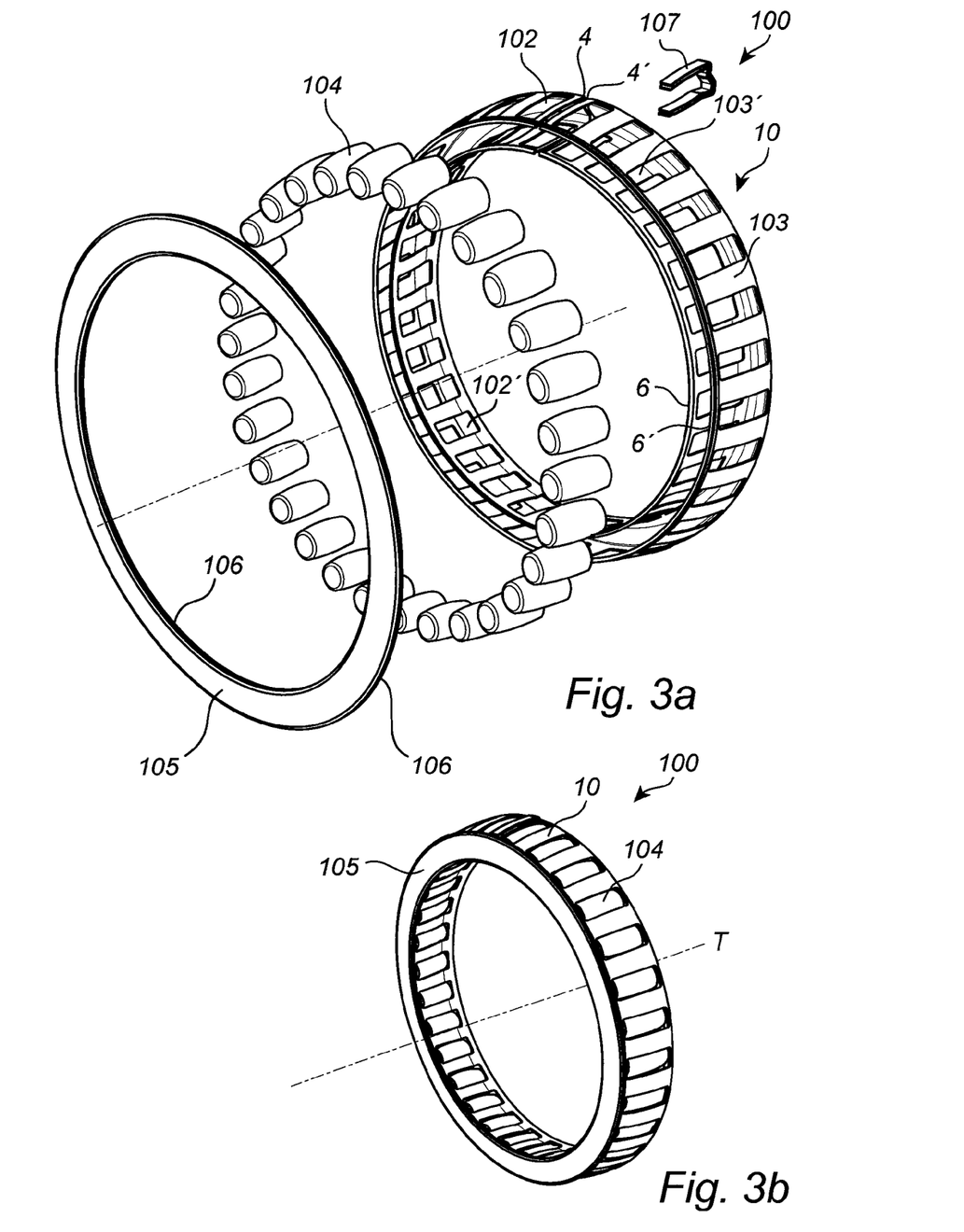
FIG. 3a shows a schematic exploded view of an annular-shaped cage assembly for a rolling bearing assembly according to an example embodiment of the present invention.
FIG. 3b shows a schematic view of the annular-shaped cage assembly depicted in FIG. 3a in an assembled configuration.

FIG. 3a shows a schematic exploded view of an annular-shaped cage assembly 100 for a rolling bearing assembly according to an example embodiment of the present invention. FIG. 3b shows a schematic view of the annular-shaped cage assembly 100 depicted in FIG. 3a in an assembled configuration. The annular-shaped cage assembly 100 here has an annular-shaped cage 10 with a U-shaped cross section. The annular-shaped cage 10 may be formed from a one-piece sheet material. A first set of windows 102 is arranged between first rib portions 103 circumferentially around the annular-shaped cage 10. A second set of windows 102' and rib portions 103' are similarly arranged radially inwards from the windows 102 and rib portions 103.

The windows 102 and 102' are adapted to receive and control the position of rolling elements 104. The rolling elements 104 may be cylindrical. The rolling elements 104 are secured by a locking ring 105 which engages with an open side (6, 6', 23, 23') of the annular-shaped cage 10. The locking ring 105 has an integrated seal 106 which seals the locking ring 105 to the annular-shaped cage 10, as illustrated in FIG. 3. The annular-shaped cage assembly 100 may further comprise a clip 107 for attaching two open ends 4, 4' of the annular cage 10 together. As mentioned above, the clip 107 can be U-shaped to securely engage with the annular cage 10.

Figure 4:
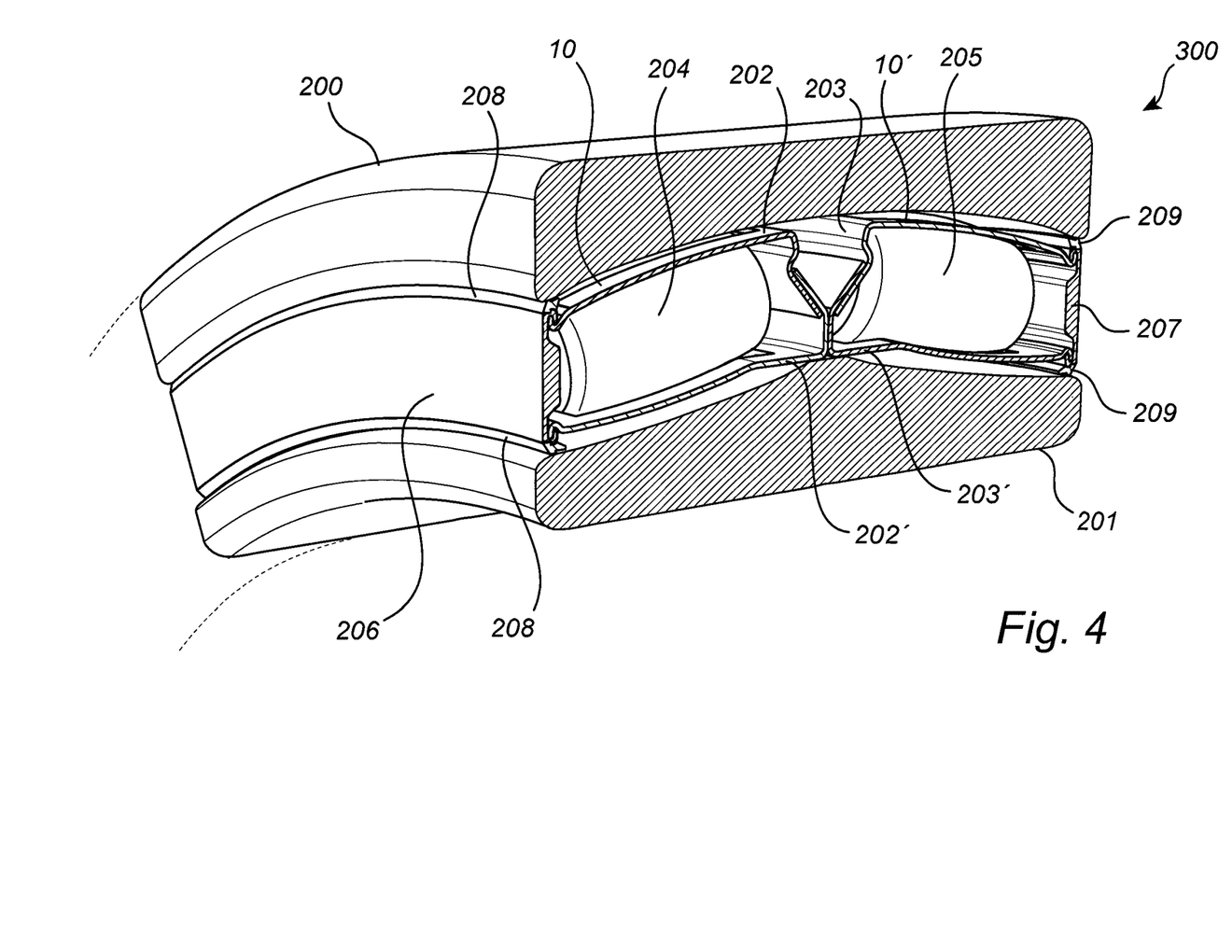
FIG. 4 shows a cross-sectional view of a rolling bearing assembly including an example embodiment of an annular-shaped cage according to the present invention, in which the rolling bearing assembly is provided with two annular-shaped cages, each annular-shaped cage contains a set of rolling elements.

FIG. 4 shows a cross-sectional view of a rolling bearing assembly including an example embodiment of an annular-shaped cage (and annular-shaped cage assembly) according to the present invention, in which the rolling bearing assembly is provided with two annular-shaped cages 10, 10', each annular-shaped cage contains a set of rolling elements. The rolling bearing assembly 300 here comprises an outer ring 200 and an inner ring 201. The functions and constructions of the outer ring and the inner ring are evident to the skilled person and will therefore not be further explained hereinafter. The two annular-shaped cages 10, 10' are arranged between the inner ring 200 and the outer ring 201. The annular-shaped cages are manufactured by any of the methods mentioned above. Likewise, the annular-shaped cages 10, 10' may include any of the features mentioned above with respect to the cage in FIGS. 3a and 3b. As is illustrated in FIG. 4, each annular-shaped cage 10 here consists of two parts which have been attached together to form a uniform cage having a U-shaped cross section. As illustrated in FIG. 4, these parts are denoted 202, 202', 203 and 203'. The rolling bearing assembly 300 further comprises rolling elements 204 and 205 which are secured by the annular-shaped cages 10, 10' as well as by locking rings 206, 207. The locking rings 206, 207 have integrated seals 208 and 209, respectively, for sealing the space between the inner ring 200 and outer ring 201. In this aspect of the present invention, the annular-shaped cages 10, 10' are mounted in a rolling bearing assembly for controlling the position of rolling elements between an inner and an outer raceway (i.e. the inner ring 200 and the outer ring 201) in a rolling bearing.

Figure 5A:
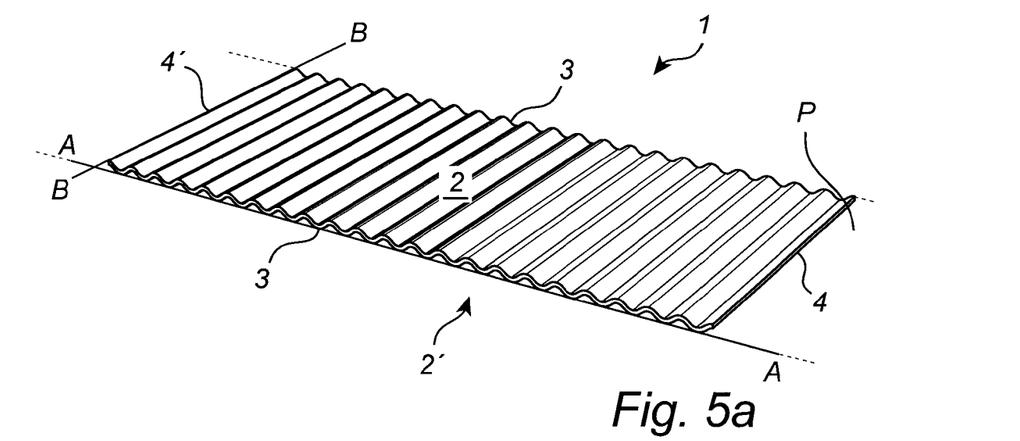
FIG. 5a schematically illustrates an example of a workpiece provided with an undulating structure, which is used for producing an annular-shaped cage for a rolling bearing assembly according to an example embodiment of the present invention.

FIG. 5a schematically illustrates an example of a workpiece provided with an undulating structure, which is used for producing an annular-shaped cage for a rolling bearing assembly according to any of the embodiments mentioned above. The construction of the workpiece 1 in FIG. 5a is the same as the workpiece in FIG. 1a besides that the workpiece 1 here is provided with an undulating structure. As may be gleaned from FIG. 5a, the undulating structure has a wave-like shape comprising a plurality of consecutively repeating sections. In this manner, when the annular-shaped cage is formed by the workpiece, the undulating structure extends circumferentially around the cage. The undulating structure of the annular-shaped cage can either be uniform or non-uniform. In more detail, the undulating, or corrugated, structure is integrally formed in the one-piece sheet material of which the annular-shaped cage is formed, for example by bending the workpiece 1 or by imprinting and/or embossing the undulating structure into the workpiece forming the cage, such that a plurality of ridges and grooves, forming the undulating structure, are formed in the workpiece 1.

One advantage with an undulating, or corrugated, structure is that the stiffness of the annular-shaped cage is improved in relation to the thickness of the sheet material of which it is formed. Thereby, the thickness and weight of the annular-shaped cage may be reduced, which, in turn, reduces its moments of inertia leading to improved and more efficient rolling bearings. For example, the wavelike shape of the undulating structure is formed of repeating sections having a sine waveform shape, a square waveform shape, a triangular waveform shape, a saw tooth waveform shape, or a combination of any of the above-mentioned waveforms. In FIG. 5a, the undulating structure of the workpiece 1 extends along the transverse direction, which corresponds to line B-B.

Figure 5B:
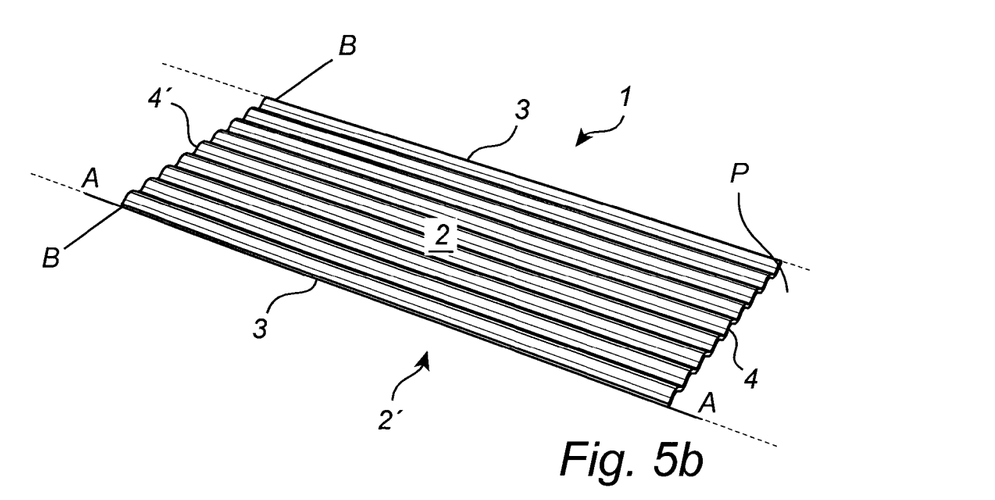
FIG. 5b schematically illustrates another example of a workpiece provided with an undulating structure, which is used for producing an annular-shaped cage for a rolling bearing assembly according to an example embodiment of the present invention.

FIG. 5b schematically illustrates another example of a workpiece provided with an undulating structure, which is used for producing an annular-shaped cage for a rolling bearing assembly according to any of the embodiments mentioned above. The construction of the workpiece 1 and its undulating structure in FIG. 5b is the same as the workpiece in FIG. 5a besides that the undulating structure of the workpiece 1 here extends along the longitudinal direction, which corresponds to line A-A.

Thanks to the present invention, as described above with references to the various figures, it becomes possible to manufacture the annular-shaped cage in a cost efficient manner, using manufacturing techniques with low scrapes rates, low tool costs and low energy consumption, while allowing for high production rates, high precision and low material costs. In particular, by the principle of the present invention, it becomes possible to manufacture an annular-shaped cage from a workpiece of a thin and light material. To this end, the thickness and weight of the cage can be reduced, which, in turn, may reduce its moments of inertia leading to improved and more efficient rolling bearings. Further, a reduced thickness of the cage will have a positive impact on the available space in the rolling bearing for holding and storing lubricant, such as grease or oil.

In addition, due to the U-shaped cross section of the annular-shaped cage, it becomes possible to provide a better holding and storing facility for the lubricant while reducing the risk of lubricant leakage.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

REFERENCE NUMERALS 1 workpiece
2 first side
2' second side
3 longitudinal edge
3' longitudinal edge
4 first transverse edge
4' second transverse edge
6 open side
6' open side
7 windows
7' windows
10 annular-shaped cage
20 circular workpiece
22 hole
23 open side
23' open side
25 windows
25' windows
30 clip
100 annular-shaped cage assembly
102 windows
102' windows
104 set of rolling elements
105 locking ring
106 integrated seal
204 set of rolling elements
205 set of rolling elements
206 locking ring
207 locking ring
208 integrated seal
209 integrated seal
300 rolling bearing assembly
P plane
T transverse axis

The invention claimed is:

1. An annular-shaped cage assembly for a rolling bearing assembly, the annular-shaped cage assembly comprising:
   an annular-shaped cage having a U-shaped cross-section and a plurality of windows for receiving and positioning a set of rolling elements,
   the plurality of windows is arranged spaced apart along a circumferential direction of the annular-shaped cage,
   a locking ring engageable with an open side of the annular-shaped cage for securing the set of rolling elements,
   the locking ring is provided with an integrated seal for sealing the locking ring to the annular-shaped cage.

2. The annular-shaped cage assembly according to claim 1, wherein the annular-shaped cage is formed from a one-piece sheet material.

3. The annular-shaped cage assembly according to claim 1, wherein the annular-shaped cage assembly further comprises a clip.

4. A method for producing an annular-shaped cage for a rolling bearing assembly, the method comprising steps of:
   providing a workpiece contained in a plane having a first side and a second side wherein the workpiece is provided in a form of a longitudinal workpiece, the longitudinal workpiece having two opposing longitudinal edges, a first transverse edge and a second transverse edge;
   forming an annular-shaped cage from the workpiece, the annular-shaped cage having a U-shaped cross section such that portions of the first side of the workpiece face each other; and
   forming a plurality of windows in the workpiece for receiving and positioning a set of rolling elements.

5. The method according to claim 4, wherein the workpiece for forming the annular-shaped cage is a one-piece sheet material.

6. The method according to claim 4, wherein the U-shaped cross section is formed by roll-forming.

7. The method according to claim 4, wherein the U-shaped cross section is formed in accordance with one of:
   (a) after the step of forming the annular-shaped cage, or
   (b) before the step of forming the annular-shaped cage.

8. The method according to claim 4, wherein after the step of forming the annular-shaped cage, the first transverse edge and the second transverse edge are attached together by a clip.

9. The method according to claim 4, wherein the plurality of windows is formed by removing pieces of material from the workpiece.

10. The method according to claim 9, wherein the pieces of material are removed by one of:
    a step of punching,
    a step of laser cutting, or
    a step of water cutting.

11. The method according to claim 4, wherein the workpiece is made of metal.

12. A method for producing an annular-shaped cage for a rolling bearing assembly, the method comprising steps of:
    providing a workpiece contained in a plane having a first side and a second side;
    forming an annular-shaped cage from the workpiece by bending the workpiece about a transverse axis, the annular-shaped cage having a U-shaped cross section such that portions of the first side of the workpiece face each other; and
    forming a plurality of windows in the workpiece for receiving and positioning a set of rolling elements.

* * * * *